April 9, 1963  J. J. O'MALLEY  3,084,568
TRANSMISSION
Filed April 14, 1960
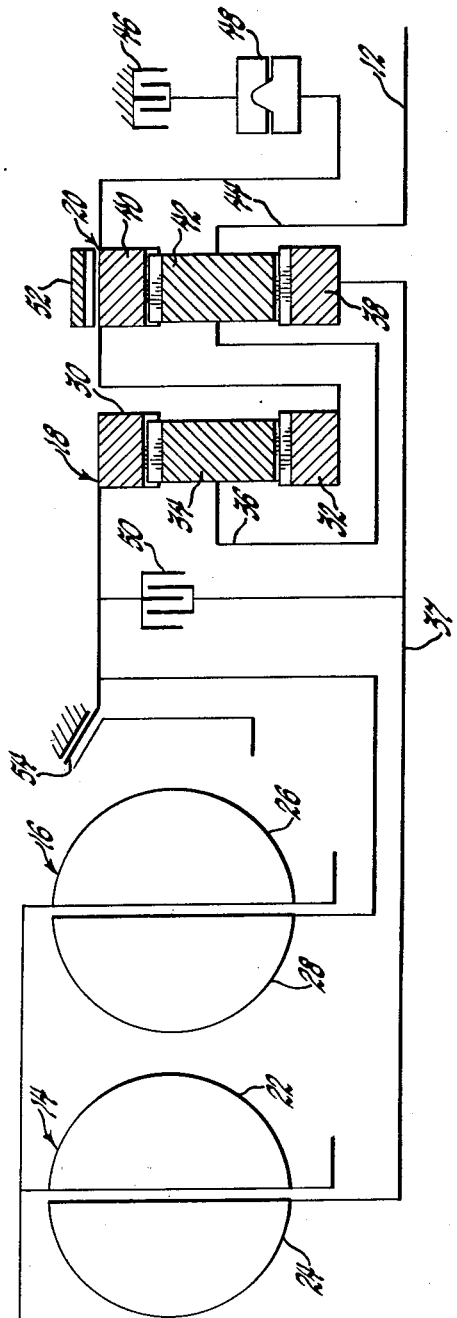
INVENTOR.
John J. O'Malley
BY
Hugh L. Fisher
ATTORNEY United States Patent Office 3,084,568
Patented Apr. 9, 1963

3,084,568
TRANSMISSION
John J. O'Malley, Livonia, Mich., assignor to General
Motors Corporation, Detroit, Mich., a corporation of
Delaware
Filed Apr. 14, 1960, Ser. No. 22,201
5 Claims. (Cl. 74—677)

This invention relates generally to transmissions, and particularly to improvements in step ratio type transmissions adapted, although not exclusively, for use with motor vehicles.

In general, for a plural step ratio transmission to be commercially acceptable, the transitions from one ratio to another should be as smooth as possible, but positive. In other words, the driver should not be able to discern any abruptness in the shift, nor on the other hand, a sensation of excessive engine speed-up as would occur during an impositive shift when temporary interruption in the drive connection between the engine and the wheels is permitted. In the past, it has been necessary to accept a compromise, and also, the proper correlations of the ratio changing devices involved in each shift required considerable and complex control circuitry.

A related concern is the need for the smooth, gradual start demanded with automatic operation. This has been customarily achieved by utilizing a hydrodynamic torque transmitting device, such as a fluid coupling or a torque converter; however, a fluid drive connection does inherently produce an added loss in efficiency due to fluid slippage and this must be considered.

Further complicating the problem are styling trends, and of course, it is mandatory that a transmission be particularly suited for manufacture according to accepted mass production techniques.

For a transmission to satisfy these many requirements, the components of the transmission must be arranged not only to afford compactness but the final result must be operationally satisfactory in an efficiency sense. Generally, planetary gearing is employed to obtain the step ratios and necessarily ratio changing devices are required to condition the gearing for each ratio. In the past, it has been customary to utilize friction devices for producing these ratio changes and of course many factors must be considered in order to produce in this fashion the smooth transition required. Also, any inefficiency from the hydrodynamic torque transmitting device usually must be compensated for by the gearing ratio. Akin to the problem is gear noise, which normally is pronounced when the gearing is compounded since the individual gears are utilized in more than one speed ratio and the different loading and speeds of operation tend to induce noise into the operation. On the other extreme, if the gearing is serially joined, considerable space in an axial direction is consumed, and this is undesirable.

With these problems in mind, the invention contemplates a transmission in which uniquely combined elements are utilized in a different way so as to produce efficient, relatively noiseless operation while affording smooth positive starts as well as transitions from one drive ratio to another.

Somewhat more specifically stated, the invention seeks to furnish a transmission incorporating hydrodynamic torque transmitting devices that are combined with planetary gearing in a novel way so as to function both as ratio establishing devices and a fluid start agency, these objectives being accomplished without need for complex operational controls or without any sacrifice in efficiency.

Other features offered by the transmission constructed in accordance with the principles of the invention include (1) coast braking, (2) minimum number of ratio changing devices, (3) minimum space requirements, (4) adaptability and suitability for diverse applications, and (5) the suitability for manufacture according to accepted mass production techniques.

The foregoing and other objects and advantages of the invention will be apparent from the following description and from the accompanying drawing in which the single FIGURE depicts schematically a transmission incorporating the concepts of the invention.

*General Arrangement*

Referring now to the drawing for the details of the transmission, the numerals 10 and 12 have been assigned respectively to a power shaft and a load shaft. In a motor vehicle installation, the power shaft 10 will be joined to the engine and the load shaft 12 to the wheels in a known manner. The driving network between the shafts 10 and 12 utilizes a pair of hydrodynamic torque transmitting devices as fluid couplings 14 and 16 hereinafter referred to, respectively, as first and second speed fluid couplings, and planetary gearing including a forwardly situated front planetary gear unit 18 and a rearwardly positioned rear planetary gear unit 20. The assemblage and connection of the gearing and the couplings affords, as will become apparent, two forward drive ranges and a reverse drive. Additionally, in a range of normal operation, which is designated as a drive range, three forward speeds are attainable.

Considering first the fluid coupling structures, each includes the usual two vaned elements: the first speed coupling, an impeller or pump 22 and a turbine 24; and the second speed coupling 16, an impeller or pump 26 and a turbine 28. The two impellers 22 and 26 are joined together and both are drive connected to the power shaft 10. Suitable provision (not shown) is made for filling and emptying the couplings 14 and 16, this being accomplished in any known way as will be understood by those versed in the art. The construction of the couplings being conventional when filled with fluid and when the impellers are revolved, a working circuit is developed with the fluid proceeding in a counterclockwise direction from the outermost portion of the impeller around the circumference of the turbine and back to the lowermost part or inlet of the impeller.

The gearing is so related to the couplings that the front gear unit 18 cooperates with the second speed coupling 16 so as to provide a second speed ratio and the rear gear unit 20 with the first speed coupling 14 for affording a first or starting drive ratio. In the front gear unit 18, drive is transferred from the second speed coupling turbine 28 to an input ring gear 30 for the front gear unit 18. A sun gear 32 functions as a reactor and meshes along with the ring gear 30 with a series of planet pinions 34 appropriately spaced and journaled on an output planet carrier 36. In the rear gear unit 20, a sun gear 38 serves as an input, being drive connected by shafting 37 to the first speed coupling turbine 24. A ring gear denoted by the numeral 40 is the reaction element for the gear unit 20 and engages another set of planet pinions 42 along with the input sun gear 38. Planet pinions 42 are revolvably supported on a planet carrier 44 that is in turn interconnected with the front gear unit carrier 36 and the load shaft 12 and therefore performs as an output for the rear gear unit 20.

Ratio changes are accomplished both by the fluid couplings 14 and 16 and several friction devices; one, a forward drive brake 46 coacts with a one-way device 48 to prevent rearward rotation of the front and rear gear unit reaction gears 32 and 40. The one-way device 48 may be of any usual construction employing rollers, sprags, or the equivalent to prevent relative rotation between confining races in one direction only. Forward drive also utilizes a third speed clutch 50 that, when engaged, joins the front gear unit input ring gear 30 and the rear gear unit input sun gear 38 for reasons to be explained. An overrun or coast brake 52 prevents rotation of the reaction gears 32 and 40 in either direction thereby providing a low range of operation, which will be discussed further in the operational summary. To establish reverse drive, a reverse brake 54 is employed for restraining rotation of the front gear unit input gear 30.

The brakes 46, 52, and 54 may be of any known type such as those utilizing disks, bands, cones, etc.; the clutch 50 also can be of any known kind employing, e.g., disks or cones. The actuation of the clutch and the brakes may be accomplished in any appropriate manner such as by hydraulic actuation, this being understood by those familiar with the art.

*Operation*

As suggested, the described transmission offers two forward ranges of operation referred to as low and drive ranges, and a reverse, as well as a neutral.

Considering the neutral condition for the transmission first, this status is established when the forward brake 46 is disengaged as are the overrun brake 52, the reverse brake 54, and the clutch 50. This renders the gearing ineffective to transfer drive, no reaction being afforded. Hence, the first speed coupling 14 can be filled so as to be prepared for immediate forward drive.

To commence forward movement in the drive range now merely requires the engagement of the forward drive brake 46; then, as engine speed is increased, the first speed coupling 14 will transmit correspondingly increasing torque to the rear unit sun gear 38. Inasmuch as the rearward rotational tendency of the rear unit reaction ring gear 40 is prevented by the combined action of the one-way device and the forward brake 46, the planet pinions will be caused by the sun gear 38 to walk around the ring gear 40 and revolve the output planet carrier 44 and accordingly the load shaft 12 at a reduced speed relative to the power shaft 10 or in the first speed ratio.

A further increase in speed will cause, through an appropriate control (not shown) the first speed coupling 14 to be emptied and the second speed coupling 16 to be filled. Therefore, drive to the rear gear unit 20 will subside as that to the front gear unit 18 increases. The front gear unit 18, as a result, will become effective and with the front unit reaction sun gear 32 prevented also from revolving backwards, the front unit carrier 36 will, through the rear unit carrier 44, revolve the load shaft 12 somewhat faster but still at a lesser speed than the power shaft 10 and thereby establish the second speed ratio. The rear gear unit 20 will be ineffective in second speed since the first speed coupling 14 is empty.

Upon a still further increase in speed, the transmission will be prepared for establishment of the third speed ratio in which the first speed coupling 14 is refilled while the second speed coupling remains full. The result will be that both the front unit input ring gear 30 and the rear gear unit input sun gear 38 will be driven at substantially the same speeds as the power shaft 10. With these two gears revolving at the same speed, both the front and rear gear units 18 and 20 will assume a locked up condition, i.e., all of the gear elements will revolve substantially together in a forward direction. The one-way device 48 permits the forward rotation of the reaction gears 32 and 40 without any change in the status of the forward drive brake 46, thereby leaving the forward drive brake 46 engaged and prepared to re-assume its function upon downshift. The gearing at this point affords, except for the effect of fluid slippage through the couplings 14 and 16, a substantially direct drive ratio for third speed operation.

Inasmuch as the two couplings 14 and 16 in third speed operate in series, there is a tendency for the first speed coupling turbine 24 to be overdriven by the rear gear unit sun gear 38, this being due to the gear action and because of the dominance of the front gear unit 18. The overdrive effect of the turbine 24 adds to the input torque the amount of overdriving effect. Of course, this increases the torque through coupling 16 and is undesirable. Therefore, the third speed clutch 50 is engaged so as to prevent the first speed coupling turbine 24 from exceeding the speed of the second speed coupling turbine 28. All of the torque delivered by the engine is consequently transferred, equally through the two couplings 14 and 16, except that lost due to the inherent fluid slippage within the couplings, to the load shaft 12.

To explain further the purpose for including the third speed clutch 50, assume that the transmission is conditioned for third speed but with clutch 50 disengaged and that the front and rear gear units 18 and 20 afford respectively 1.5 to 1 and 3 to 1 reduction ratios, i.e., 1.5 and 3 input revolutions to one output revolution. As a consequence, the reaction from the rear gear unit sun gear 38 in overdriving the turbine 24 will increase the torque through the coupling 16 to 1⅓ times input or engine torque. In other words, the coupling 16 must have the capacity or ability to transmit not only the input torque from the power shaft 10 but also the reaction torque from coupling 14. Meanwhile coupling 14 will be required to handle only one-third of the input torque. As can be seen, not only must coupling 16 be relatively large but its efficiency will be low. But when clutch 50 is engaged, which may occur any time after coupling 14 is filled to establish third speed, thus eliminating any need for coordinating controls, the reaction from sun gear 38 is transferred by clutch 50 back to the input ring gear 30. This relieves coupling 14 of the duty and now coupling turbines 24 and 28 are joined both together and to gear set 18 so that drive through coupling 14 is from the impeller 22 and to the turbine 24 instead of from the turbine 24 to the impeller 22 as it is when the clutch 50 is not engaged. With this arrangement, when the clutch 50 is engaged, if the two couplings 14 and 16 are hydrodynamically the same, they will equally share the transfer of engine torque.

Reverse drive requires only the engagement of the reverse brake 54 and the filling of the first speed coupling 14. The forward drive brake 46, the overrun brake 52, and the third speed clutch 50 are all disengaged and the second speed coupling 16 is emptied. The drive transmitted by the first speed coupling 14 will be in a forward direction and to the rear gear unit input sun gear 38. Since no reaction is being offered, the rear gear unit reaction ring gear 40 will revolve rearwardly and carry therewith the front gear unit reaction sun gear 32. The front unit ring gear 30 tends at this time to revolve forwardly but is prevented by the reverse drive brake 54 so that the front unit planet carrier 36 will be forced rearwardly at a reduced speed and necessarily, through the intermediary of the rear gear unit planet carrier 44 carry therewith the load shaft 12.

Low range is the same as the first speed ratio in the drive range, except that the overrun brake 52 is engaged. Hence, the slowest speed is available with drive proceeding from the first speed coupling 14 through the rear gear unit 20 at the ratio determined thereby. If, in this range of operation, the vehicle commences to coast as would occur when descending a hill, the load shaft 12 will commence to drive, with the result that the reaction forces on the rear gear unit reaction gear 40 will reverse and the gear 40 will tend to revolve forwardly. Of course, the one-way device 48 permits this, and if allowed, there would be no drive connection between the engine and the wheels and the braking resistance inherently available from the engine would be lost. This is the purpose of the coast brake 52, which as mentioned, prevents rotation of the rear gear unit reaction gear 40 in either direction and particularly in the forward direction. Now, the rear gear unit sun gear 38 will desirably be overdriven and attempt, through the first speed coupling 14, to overdrive the engine, thereby more effectively utilizing the compression of the engine as a brake.

If desired, the control system for the transmission can be so arranged that the overrun or coast brake 52 can be engaged in the intermediate speed also. This affords coast braking in the same way as just described.

From the foregoing, it can be seen that a fluid coupling is utilized for the fluid start and also functions as a ratio changing device. This offers a smooth start as well as a relatively imperceptible ratio change. Another fluid coupling offers another smooth ratio change so that together the couplings substantially eliminate all drive line shocks and vibrations, thereby furnishing a relatively noise free transmission. The correlation of the units is such as to keep the influence from fluid losses on the over-all operation to a minimum. Moreover, the transmission is susceptible of many different arrangements to suit varied installations requiring the ratio coverage offered as well as affording only a limited space for the transmission.

The invention is to be limited only by the following claims.

I claim:

1. In a transmission, the combination of driving and driven shafts, first and second planetary gear units each including an input gear, a reaction gear and an output planet carrier having a planet pinion revolvably supported thereon so as to be in intermeshing relation with both the input and reaction gears, the output carrier for each gear unit being joined to the driven shaft, brake means for preventing rotation of both reaction gears in one direction, and a plurality of hydrodynamic torque transmitting devices each operative when filled with fluid to transfer drive therethrough, one of the hydrodynamic torque transmitting devices being so arranged as to transfer drive from the driving shaft to the first gear unit input gear and another of the hydrodynamic torque transmitting devices being so arranged as to transfer drive from the driving shaft to the second gear unit input gear, the first gear unit affording one drive ratio through the transmission when said one hydrodynamic torque transmitting device is operative and the second gear unit affording another drive ratio through the transmission when said another hydrodynamic torque transmitting device is operative, and clutch means operative to join both the first and second gear unit input gears, both gear units combining when both hydrodynamic torque transmitting devices and the clutch means are operative to provide a substantially direct drive through the transmission.

2. In a transmission, the combination of driving and driven shafts, first and second planetary gear units each including an input gear, a reaction gear and an output planet carrier having a planet pinion revolvably supported thereon so as to be in intermeshing relation with both the input and reaction gears, the output carrier for each gear unit being joined to the driven shaft, brake means for preventing rotation of both reaction gears in one direction, and a plurality of fluid couplings each operative when filled with fluid to transfer drive therethrough, one of the fluid couplings being so arranged as to transfer drive from the driving shaft to the first gear unit input gear and another of the fluid couplings being so arranged as to transfer drive from the driving shaft to the second gear unit input gear, the first gear unit affording one drive ratio through the transmission when said one hydrodynamic torque transmitting device is operative and the second gear unit affording another drive ratio through the transmission when said another hydrodynamic torque transmitting device is operative, and clutch means operative to join both the first and second gear unit input gears, both gear units combining when both hydrodynamic torque transmitting devices and the clutch means are operative to provide a substantially direct drive through the transmission.

3. In a transmission, the combination of drive and driven shafts, first and second planetary gear units each including a sun gear, a ring gear, and a planet carrier having a planet pinion revolvably positioned thereon so as to be in intermeshing relation with both the sun and ring gears, the planet carriers of each gear unit being joined to the driven shaft, the sun gear of the first gear unit being connected to the ring gear of the second gear unit, brake means including a one-way device operative to prevent rotation of the connected first gear unit sun gear and the second gear unit ring gear in one direction, the brake means when inoperative affording a neutral condition for the transmission, a plurality of fluid couplings operative to transfer drive from the driving shaft when filled with fluid, one of the fluid couplings when operative transferring drive from the driving shaft to the first gear unit ring gear and another of the fluid couplings when operative transferring drive from the driving shaft to the second gear unit sun gear, and clutch means operative to join both the first and second gear unit input gears, the second gear unit being effective to afford a low speed forward drive through the transmission when said another fluid coupling is operative, the first gear unit providing an intermediate speed drive when said one fluid coupling is operative, both gear units combining when both fluid couplings and the clutch means are operative to produce a substantially direct drive through the transmission.

4. In an engine driven transmission provided with plural forward drive ranges, the combination of a drive shaft drive connected to the engine, a driven shaft, first and second planetary gear units each including an input gear, a reaction gear, and an output planet carrier having a planet pinion revolvably supported thereon so as to intermesh both with the input and reaction gears, the output carrier for each gear unit being joined to the driven shaft, the reaction gears for each gear unit being joined together, forward drive brake means for preventing rotation of the reaction gears in one direction so as to establish one drive range, overrun brake means operative for preventing rotation of the reaction gears in either direction so as to establish another drive range, a plurality of hydrodynamic torque transmitting devices operative when filled with fluid to transfer drive from the driving shaft, one of the hydrodynamic torque transmitting devices transferring drive from the driving shaft to the first gear unit input gear and another of the hydrodynamic torque transmitting devices transferring drive from the driving shaft to the second gear unit input gear, and clutch means operative to join the first and second gear unit input gears, the first gear unit affording the one drive ratio through the transmission when said one hydrodynamic torque transmitting device is operative, the second gear unit affording another drive ratio through the transmission when said another hydrodynamic torque transmitting device is operative, both gear units combining when both hydrodynamic torque transmitting devices and the clutch means are operative so as to provide a substantially direct drive through the transmission, the overrun brake means being rendered operative in said another drive range so as to provide engine braking during coast with the driven shaft driving.

5. In a transmission, the combination of driving and driven shafts, planetary gearing including plural inputs, a reaction element, and an output element, the output element being drive connected to the driven shaft, brake means for preventing rotation of the reaction element, a plurality of hydrodynamic torque transmitting devices each operative when filled with fluid to transfer drive therethrough, one of the hydrodynamic torque transmitting devices being so arranged as to transfer drive from the driving shaft to one of the planetary gearing input elements thereby affording one drive ratio, another of the hydrodynamic torque transmitting devices being arranged so as to transfer drive from the driving shaft to another of the planetary gearing input elements thereby affording another drive ratio, and clutch means operative to join the plural input elements so that when both hydrodynamic torque transmitting devices are operative, a substantially direct drive through the transmission is provided.

References Cited in the file of this patent

UNITED STATES PATENTS

| | | |
|---|---|---|
| 2,519,022 | Burtnett | Aug. 15, 1950 |
| 2,748,621 | Sinclair | June 5, 1956 |
| 2,749,777 | Simpson | June 12, 1956 |
| 2,873,618 | De Lorean | Feb. 17, 1959 |
| 2,911,853 | Sand | Nov. 10, 1959 |
| 2,968,197 | De Lorean | Jan. 17, 1961 |